United States Patent
Rumohr et al.

(10) Patent No.: US 10,531,612 B2
(45) Date of Patent: Jan. 14, 2020

(54) RELEASABLE GRID BARS FOR A COTTON CLEANER

(71) Applicant: DEERE & COMPANY, Moline, IL (US)

(72) Inventors: John O. Rumohr, Pleasant Hill, IA (US); Kevin J. Goering, Cambridge, IA (US)

(73) Assignee: DEERE & COMPANY, Moline, IL (US)

( * ) Notice: Subject to any disclaimer, the term of this patent is extended or adjusted under 35 U.S.C. 154(b) by 256 days.

(21) Appl. No.: 15/602,216

(22) Filed: May 23, 2017

(65) Prior Publication Data
US 2018/0340271 A1  Nov. 29, 2018

(51) Int. Cl.
*A01D 46/12* (2006.01)

(52) U.S. Cl.
CPC .................................. *A01D 46/12* (2013.01)

(58) Field of Classification Search
CPC ... D01B 1/02; D01B 1/04; D01B 1/06; D01B 1/08; D01G 9/00; D01G 9/02; D01G 9/04; D01G 9/06; D01G 9/08; D01G 9/10; A01D 46/08
See application file for complete search history.

(56) References Cited

U.S. PATENT DOCUMENTS

| | | | |
|---|---|---|---|
| 1,462,307 A * | 7/1923 | St Onge Amasa | D01G 9/04 19/95 |
| 2,691,473 A * | 10/1954 | Gantzer | B65B 61/22 19/144 |
| 3,559,804 A * | 2/1971 | Lytton | D01G 9/00 19/205 |
| 4,821,497 A | 4/1989 | Deutsch et al. | |
| 5,212,937 A | 5/1993 | Fachini et al. | |
| 5,247,721 A * | 9/1993 | Demuth | D01G 15/34 19/105 |
| 5,392,495 A * | 2/1995 | Horn | D01B 1/04 19/48 R |
| 6,325,215 B1 | 12/2001 | Anthony | |
| 6,539,585 B1 | 4/2003 | Anthony | |
| 6,615,454 B1 | 9/2003 | Anthony | |
| 2003/0129049 A1* | 7/2003 | Evans | A01D 87/003 414/721 |
| 2005/0217076 A1* | 10/2005 | Gvili | D01B 1/04 19/40 |

* cited by examiner

*Primary Examiner* — Khoa D Huynh
*Assistant Examiner* — Aiying Zhao
(74) *Attorney, Agent, or Firm* — Taft Stettinius & Hollister LLP; Stephen F. Rost (57) ABSTRACT

Cotton cleaner assembly with saw drum and releasable grid bar mechanism that includes bars and a release mechanism that moves the bars between operational and released positions is disclosed. In operational position, the release mechanism locks the bars in a fixed position relative to the saw drum to knock debris from cotton that rotates with the saw drum. In released position, the release mechanism moves the bars away from the saw drum to enable blockages that interfere with saw drum rotation to be cleared. The grid bar mechanism can include side members, where the bars extend between the side members, and the release mechanism moves the side members. The release mechanism can manually or hydraulically pivot the side members about pivot points against and away from stops. The pivot points and stops can be adjustable to adjust distance between the bars and saw drum in the operational position.

14 Claims, 10 Drawing Sheets

RELEASABLE GRID BARS FOR A COTTON CLEANER

FIELD OF THE DISCLOSURE

The present disclosure relates to agricultural machinery, and more particularly to releasable grid bars for cotton harvesting machinery.

BACKGROUND

In certain crop conditions and instances, the cleaner on a cotton stripper machine can become plugged. This can happen for many reasons including an overfilled accumulator/basket that blocks the cleaner exit, wet cotton conditions, green cotton conditions, uneven flow of cotton into the cleaner that creates lumps/slugs of cotton that wedge between grid bars and saw drum, foreign objects (wood, rocks, etc.) lodged in the cleaner, flow of cotton material into the cleaner is too great, etc. When a cotton stripper machine becomes plugged, either one or more of the saw drums is unable to rotate, due to cotton becoming wedged between the saw drums and the grid bars. In the event of a cleaner plug, the machine must be shut down to dislodge or clear the plug. While the machine is shut down, the saw drums must be manually turned in reverse of the operational direction to try to work out the cotton plug. A wrench or tool is typically required to manually turn the saw drums. Depending on the severity of the plug, it can take 30 minutes or longer to unplug the cleaner, resulting in a loss of time and productivity. Unplugging a cleaner can be performed by one person, but it is easiest with two or more people.

It would be desirable to have an easier and faster way to clear cotton and/or foreign objects that become wedged between the saw drums and the grid bars.

SUMMARY

A releasable grid bar mechanism is disclosed for use with a saw drum in a cotton cleaner assembly. The releasable grid bar mechanism includes a plurality of bars and a grid bar release mechanism that moves the plurality of bars between an operational position and a released position. In the operational position, the grid bar release mechanism locks the plurality of bars in a fixed position relative to the saw drum to knock debris from cotton that rotates with the saw drum. In the released position, the grid bar release mechanism moves the plurality of bars away from the saw drum to enable blockages that interfere with rotation of the saw drum to be cleared.

The releasable grid bar mechanism can also include first and second side members, where each of the plurality of bars extends between the first and second side members, and the grid bar release mechanism moves the first and second side members to move the plurality of bars between the operational and released positions. The first side member can include a first pivot point and the second side member can include a second pivot point, such that the grid bar release mechanism pivots the first and second side members about the first and second pivot points, respectively, to move the plurality of bars between the operational and released positions. The first and second pivot points can be adjustable to adjust the distance between the plurality of bars and the saw drum when the plurality of bars are in the operational position.

The releasable grid bar mechanism can also include first and second stops, where the grid bar release mechanism pivots the first side member about the first pivot point to lock the first side member against the first stop and pivots the second side member about the second pivot point to lock the second side member against the second stop to position the plurality of bars in the operational position, and the grid bar release mechanism pivots the first side member about the first pivot point away from the first stop and pivots the second side member about the second pivot point away from the second stop to place the plurality of bars in the released position. The first and second stops can be adjustable to adjust the distance between the plurality of bars and the saw drum when the plurality of bars are in the operational position.

The releasable grid bar mechanism can also include a shaft, a first linkage coupling the shaft to the first side member, and a second linkage coupling the shaft to the second side member, where rotation of the shaft moves the first and second linkages to move the first and second side members to move the plurality of bars between the operational and released positions. A lever can be attached to the shaft, where the lever can move the shaft to move the plurality of bars between the operational and released positions. The shaft can have a multisided shape such that a wrench can be coupled to the shaft to rotate the shaft to move the plurality of bars between the operational and released positions.

The shaft can rotate about a rotation axis. The first linkage can include a first front member and a first rear member connected at a first pivot point, where the first front member couples the first side member to the first pivot point and the first rear member couples the shaft to the first pivot point. The second linkage can include a second front member and a second rear member connected at a second pivot point, where the second front member couples the second side member to the second pivot point and the second rear member couples the shaft to the second pivot point. In this arrangement, rotation of the shaft in one direction can align the front and rear members of the first and second linkages to move the first and second side members against the first and second stops and move the plurality of bars into the operational position, and rotation of the shaft in the opposite direction can bend the first and second linkages about the first and second pivot points to move the first and second side members away from the first and second stops and move the plurality of bars into the released position.

The releasable grid bar mechanism can include a first hydraulic cylinder coupling the first side member to the cotton cleaner assembly, and a second hydraulic cylinder coupling the second side member to the cotton cleaner assembly, where retraction and extension of the first and second hydraulic cylinders moves the first and second side members to move the plurality of bars between the operational and released positions.

A cotton cleaner assembly is disclosed that includes a rotatable saw drum with a plurality of teeth, a plurality of bars and a grid bar release mechanism that moves the plurality of bars between an operational position and a released position. In the operational position, the grid bar release mechanism locks the plurality of bars in a fixed position relative to the saw drum to clean debris from cotton caught on the plurality of teeth that rotate on the saw drum. In the released position, the grid bar release mechanism moves the plurality of bars away from the saw drum to enable blockages between the saw drum and the plurality of bars that interfere with rotation of the saw drum to be cleared. The cotton cleaner assembly can also include first and second side members, where each of the plurality of bars extend between the first and second side members, and the grid bar release mechanism moves the first and second side members to move the plurality of bars between the operational and released positions. The first side member can include a first pivot point, and the second side member can include a second pivot point, where the grid bar release mechanism pivots the first and second side members about the first and second pivot points respectively to move the plurality of bars between the operational and released positions. The first and second pivot points can be adjustable to adjust the distance between the plurality of bars and the saw drum when the plurality of bars are in the operational position. The cotton cleaner assembly can include first and second stops, where the grid bar release mechanism pivots the first side member about the first pivot point to lock the first side member against the first stop and pivots the second side member about the second pivot point to lock the second side member against the second stop to position the plurality of bars in the operational position, and the grid bar release mechanism pivots the first side member about the first pivot point away from the first stop and pivots the second side member about the second pivot point away from the second stop to place the plurality of bars in the released position. The first and second stops can be adjustable to adjust the distance between the plurality of bars and the saw drum when the plurality of bars are in the operational position.

The grid bar release mechanism can include a shaft, a first linkage coupling the shaft to the first side member, and a second linkage coupling the shaft to the second side member, where rotation of the shaft moves the first and second linkages to move the first and second side members to move the plurality of bars between the operational and released positions. A lever can be attached to the shaft, where the lever moves the shaft to move the plurality of bars between the operational and released positions. The shaft can have a multisided shape such that a wrench can be coupled to the shaft to rotate the shaft to move the plurality of bars between the operational and released positions. Alternatively, the grid bar release mechanism can include first and second hydraulic cylinders coupling the first and second side members to the cotton cleaner assembly, and retraction and extension of the first and second hydraulic cylinders can move the first and second side members to move the plurality of bars between the operational and released positions.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
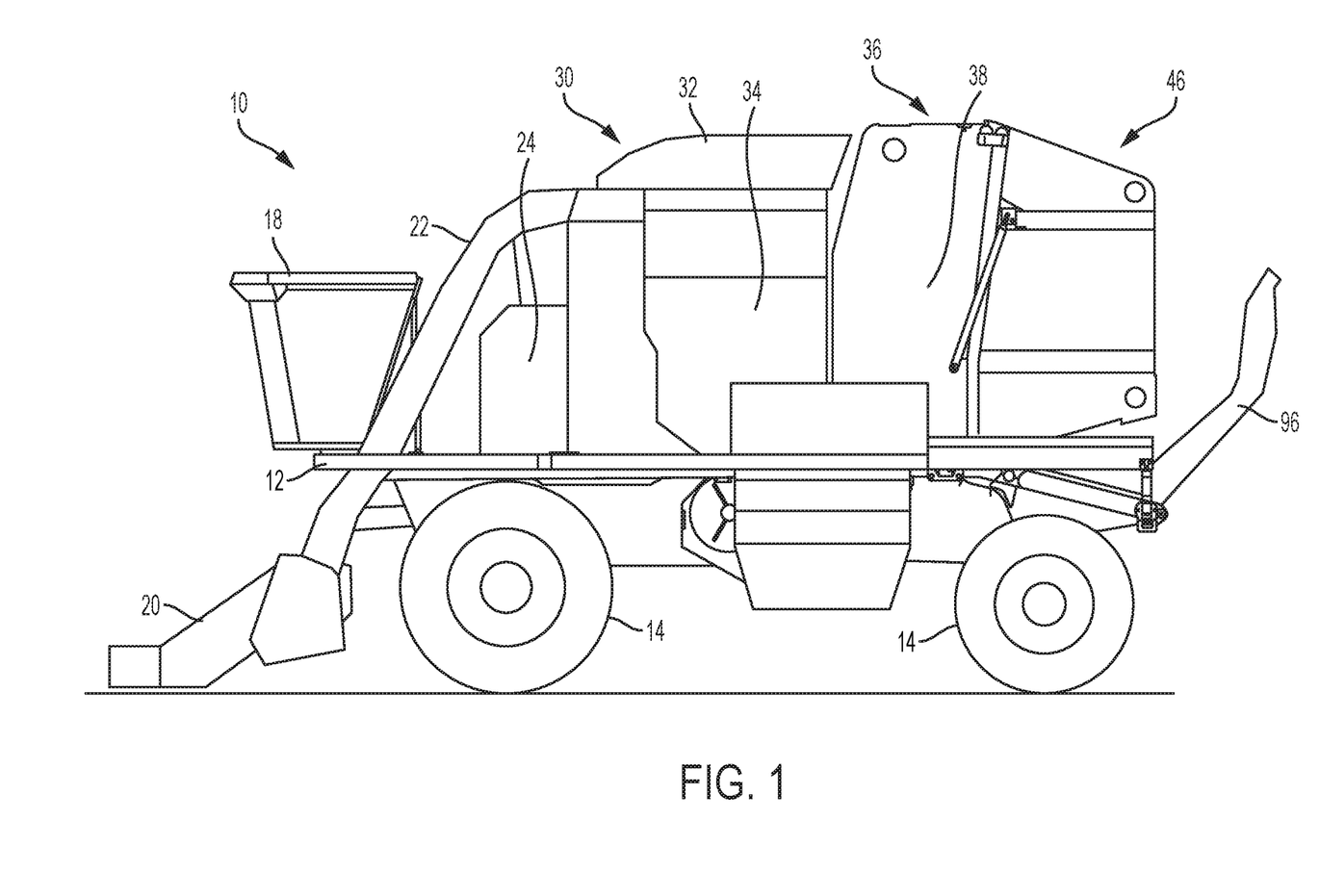
FIG. 1 illustrates an exemplary cotton harvesting machine.

FIG. 1 illustrates an exemplary cotton stripper 10 including a main frame 12 supported for movement by wheels 14. An operator's cab 18 is supported at a forward location on an elevated region of the frame 12 so as to provide the operator with a clear view of a cotton stripping head 20 mounted to a forward end of the frame 12. The cotton stripping head 20 removes cotton bolls (seed cotton and burrs), green bolls, leaves and other debris from the cotton plants and directs the removed material into an air conveying system including an air duct arrangement 22. Cotton then passes through a cotton cleaner assembly 24 supported on the frame 12 behind the cab 18. The cotton cleaner assembly 24 receives the cotton from the air duct arrangement 22 and removes burrs, sticks and other material from the cotton. The cotton is then blown back up into a cotton accumulator arrangement 30 with an upper inlet structure 32 and a metering floor 34 supported on the frame 12 for receiving the cotton from the cotton cleaner assembly 24. A selectively operable cotton processor 36, which includes a module or bale forming apparatus, is supported rearward of the accumulator arrangement 30. The accumulator arrangement 30 stores cotton as necessary. The metering floor 34 includes an arrangement to uniformly distribute the cotton before releasing it into a module-forming chamber 38.

The module-forming chamber 38 is coupled to the main frame 12, and includes a discharge gate 46. The discharge gate 46 pivots between a lowered module-forming position and a raised module-discharge position. The module-forming chamber 38 includes a plurality of endless belts supported across a plurality of fixed and movable rolls, and a belt tensioning arm arrangement used to form a module. A module or bale wrapping apparatus can be mounted to a rear wall of the discharge gate 46 to wrap the module in wrapping material. When the module is wrapped and ready for discharge, the discharge gate 46 can be pivoted to its raised discharge position for permitting a wrapped module to roll onto a cradle-shaped framework 96 of a module discharge arrangement.

Figure 2A:
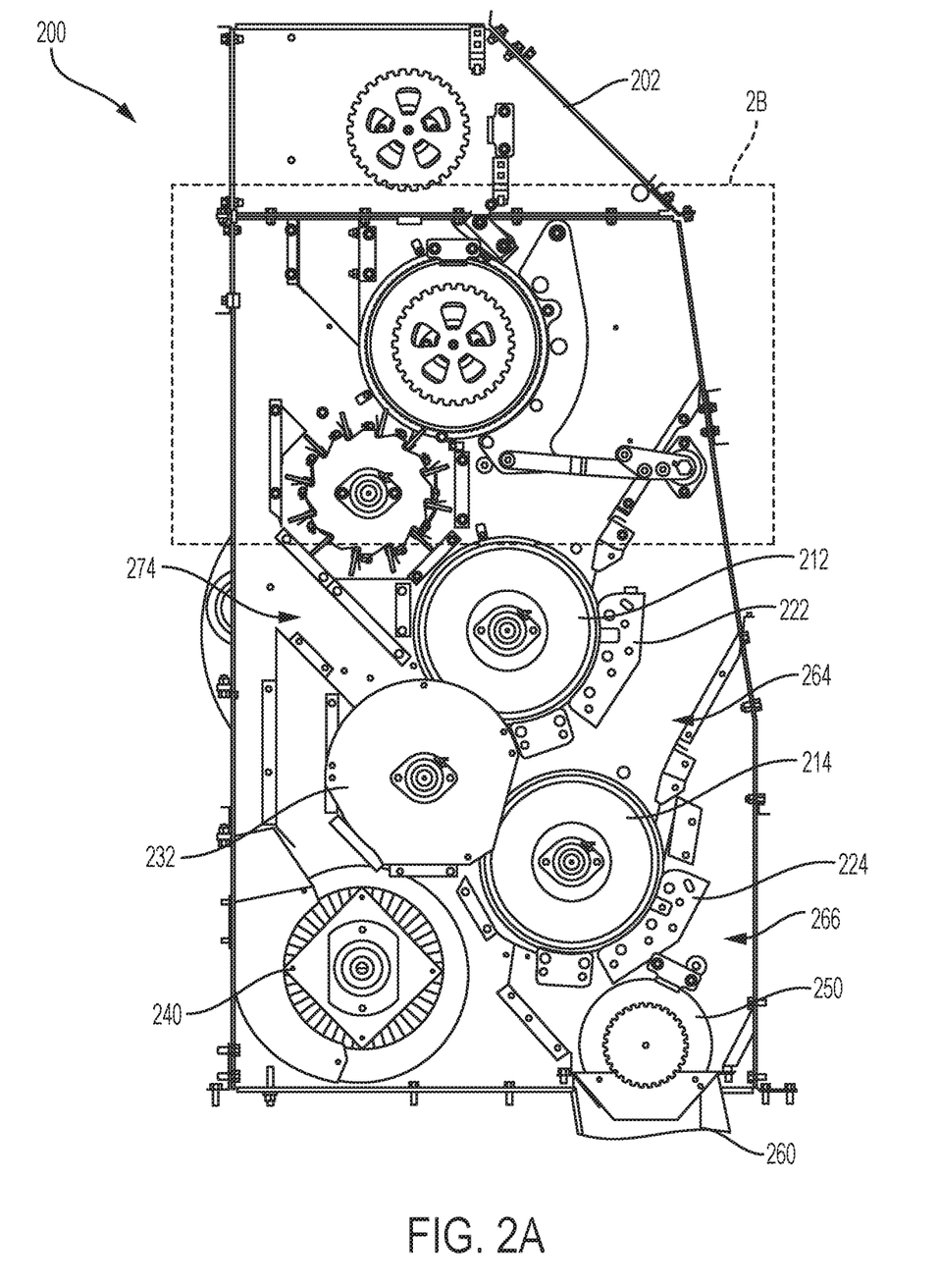
FIG. 2A illustrates a side view of an exemplary cotton cleaner assembly.
Figure 2B:
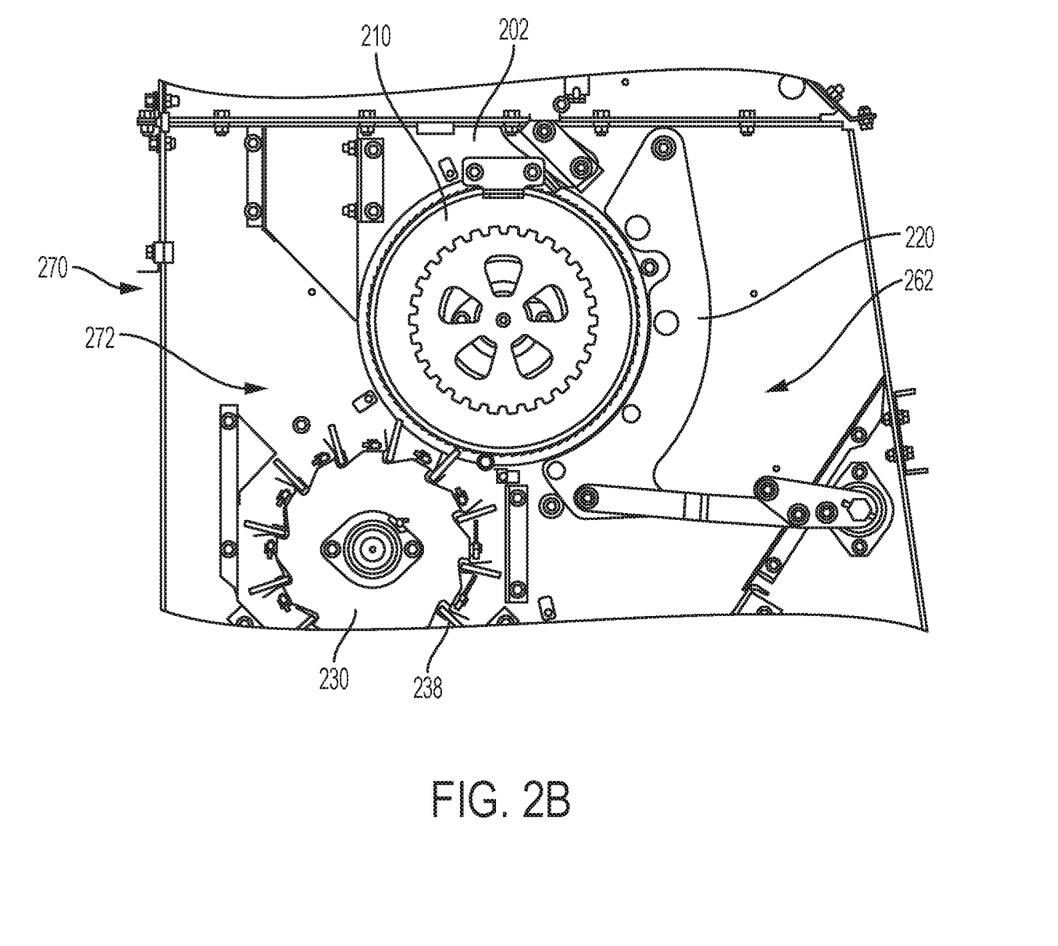
FIG. 2B illustrates a close up view of the area 2B outlined in FIG. 2A.
Figure 3:
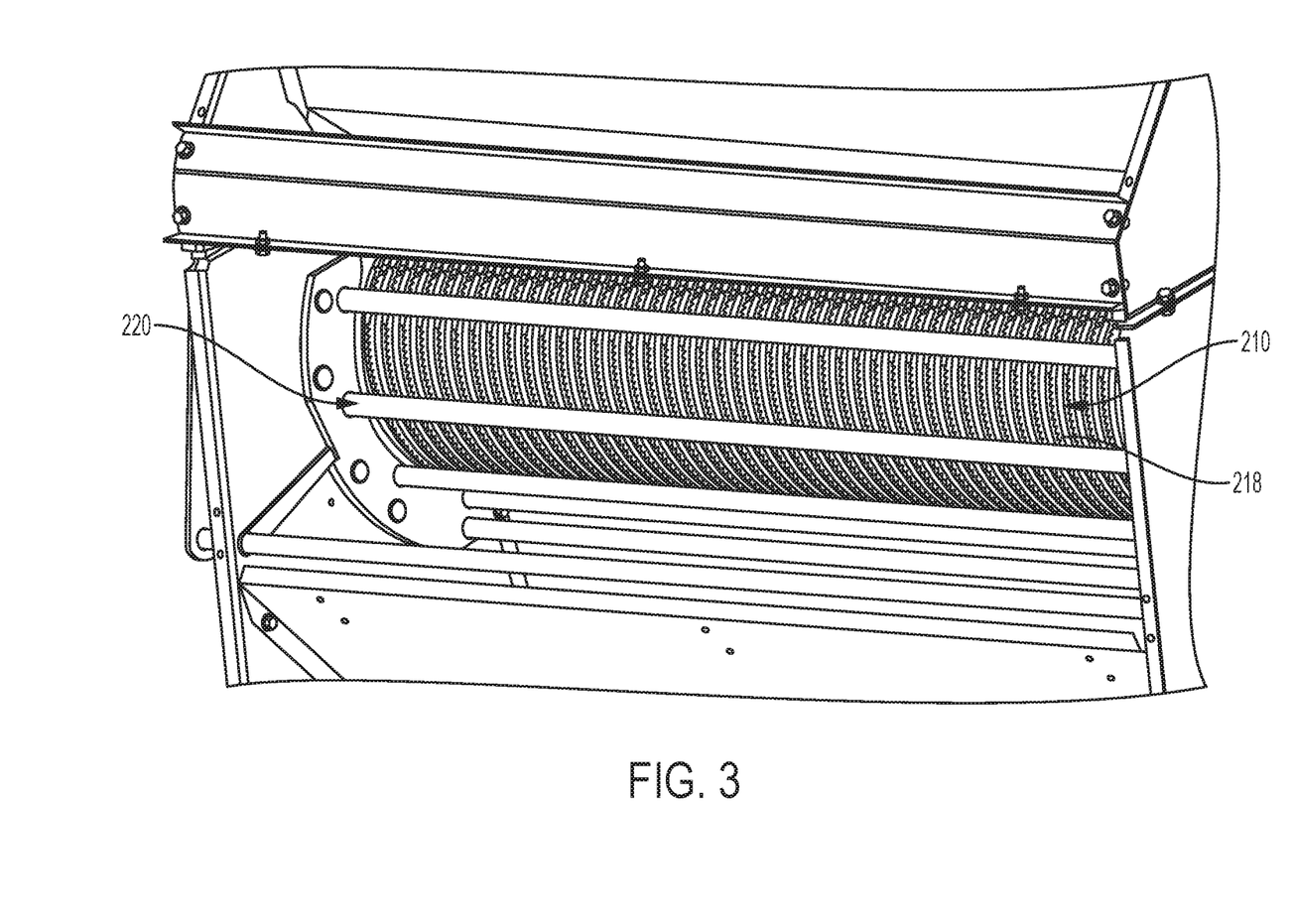
FIG. 3 illustrates a front view of the portion of the exemplary cotton cleaner assembly shown in FIG. 2B.

FIG. 2A shows a side view of an exemplary cotton cleaner assembly 200 of a cotton stripper. FIG. 2B shows a close up view of the area 2B outlined in FIG. 2A. FIG. 3 shows a front view of the portion of the exemplary cleaner assembly 200 shown in FIG. 2B. The exemplary cleaner assembly 200 includes an inlet 202, a plurality of saw drums 210, 212, 214; a set of grid bars 220, 222, 224 for each of the saw drums 210, 212, 214; a plurality of doffer drums 230, 232; a fan 240; an auger 250; a trash outlet 260 and a cotton outlet 270. A cleaner assembly can have more or less saw drums and doffer drums. Each of the saw drums 210, 212, 214 rotate and have sharp teeth 218 to grab the cotton. The doffer drums 230, 232 have brushes 238 to pull the cotton off of the teeth 218 of the saw drums 210, 212, 214. FIGS. 2A and 2B show the top doffer drum 230 with the end plate removed to make the brushes 238 visible. The middle doffer drum 232 is shown in FIG. 2A with the end plate in place. The doffer drum end plates are optional.

The cotton stripping head 20 strips cotton along with debris from the cotton plants and delivers it to the cotton cleaner inlet 202 where the cotton and debris drops onto the top saw drum 210. Each of the saw drums 210, 212, 214 rotate in the clockwise direction. The teeth 218 of the top saw drum 210 catch the cotton, and rotate the cotton and debris from the inlet 202 into the top set of grid bars 220. The grid bars 220 knock the rotating debris and loose cotton from the saw drum 210 into a top debris chute 262 where this material falls onto the middle saw drum 212. The doffer drums 230, 232 rotate in the counterclockwise direction and rotate faster than their associated saw drums. The rotation of the top doffer drum 230 in the opposite direction of the top saw drum 210 and at a faster speed enables the brushes 238 of the top doffer drum 230 to pull the cotton off of the teeth 218 of the top saw drum 210. The brushes 238 of the top doffer drum 230 throw the cotton picked off of the teeth 218 of the top saw drum 210 into a top exit chute 272.

The teeth 218 of the middle saw drum 212 catch the cotton and debris falling down the top debris chute 262. The middle saw drum 212 rotates this material into the middle set of grid bars 222. The middle set of grid bars 222 knock the rotating debris and loose cotton from the middle saw drum 212 into a middle debris chute 264 where this material falls onto the lower saw drum 214. The rotation of the middle doffer drum 232 in the opposite direction of the middle saw drum 212 and at a faster speed enables the brushes 238 of the middle doffer drum 232 to pull the cotton off of the teeth 218 of the middle saw drum 212. The brushes 238 of the middle doffer drum 232 throw the cotton picked off of the teeth 218 of the middle saw drum 212 into a middle exit chute 274.

The teeth 218 of the lower saw drum 214 catch the cotton and debris falling down the middle debris chute 264. The lower saw drum 214 rotates this material into the lower set of grid bars 224. The lower set of grid bars 224 knock the rotating loose debris from the lower saw drum 214 into a lower debris chute 266 where this material falls onto the auger 250. The rotation of the middle doffer drum 232 in the opposite direction of the lower saw drum 214 and at a faster speed enables the brushes 238 of the middle doffer drum 232 to pull the cotton off of the teeth 218 of the lower saw drum 214. The brushes 238 of the middle doffer drum 232 throw the cotton picked off of the teeth 218 of the lower saw drum 214 into the middle exit chute 274.

The auger 250 takes the debris falling down the lower debris chute 266 and moves this material to the trash chute 260 where it falls from the cotton cleaner assembly 200.

The cotton thrown into the top exit chute 272 by the brushes 238 of the top doffer drum 230 and into the middle exit chute 274 by the brushes 238 of the middle doffer drum 232 is blown by the fan 240 up and out of the cotton cleaner assembly 200 through the outlet 270 and into the cotton accumulator arrangement 30.

Different embodiments of the cotton cleaner assembly 200 can have more or less saw drums, doffer drums and sets of grid bars. Different embodiments of the cotton cleaner assembly 200 can also have different arrangements of debris chutes, exit chutes, inlets and outlets. In general, the more saw drums that are used will clean more trash and debris out of the incoming cotton and debris mixture.

Figure 4A:
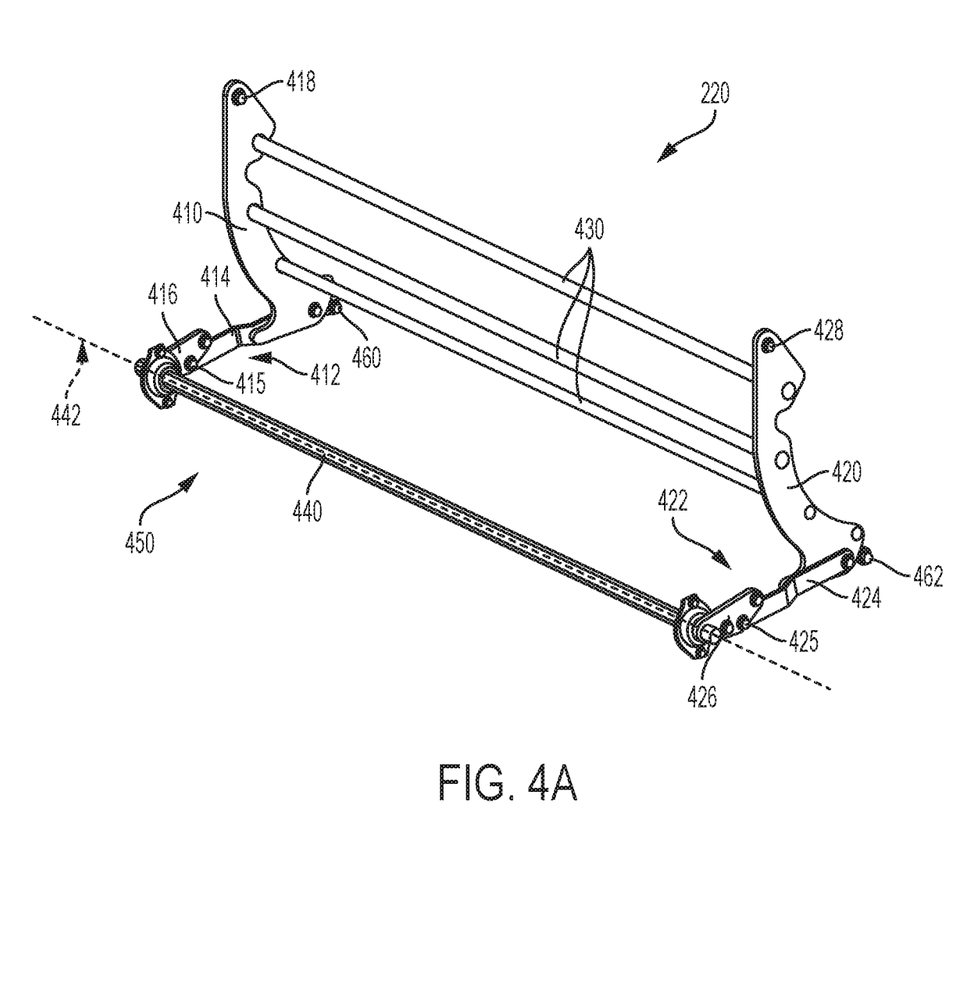
FIG. 4A illustrates an exemplary embodiment of a set of grid bars in an operational or locked position (as illustrated in FIGS. 2A and 2B) without the other components of the cotton cleaner assembly.

FIG. 4A shows an exemplary embodiment of the top set of grid bars 220 in an operational or locked position (as illustrated in FIGS. 2A and 2B) without the other components of the cotton cleaner assembly 200 for clarity. This exemplary embodiment of the top set of grid bars 220 includes a first side member 410, a second side member 420, one or more bars 430 and a grid bar release mechanism 450. Each of the one or more bars 430 are connected at opposite ends to the first and second side members 410, 420. The first side member 410 has a first pivot point 418, and the second side member 420 has a second pivot point 428. FIG. 4A also shows a first stop 460 and a second stop 462.

Figure 4B:
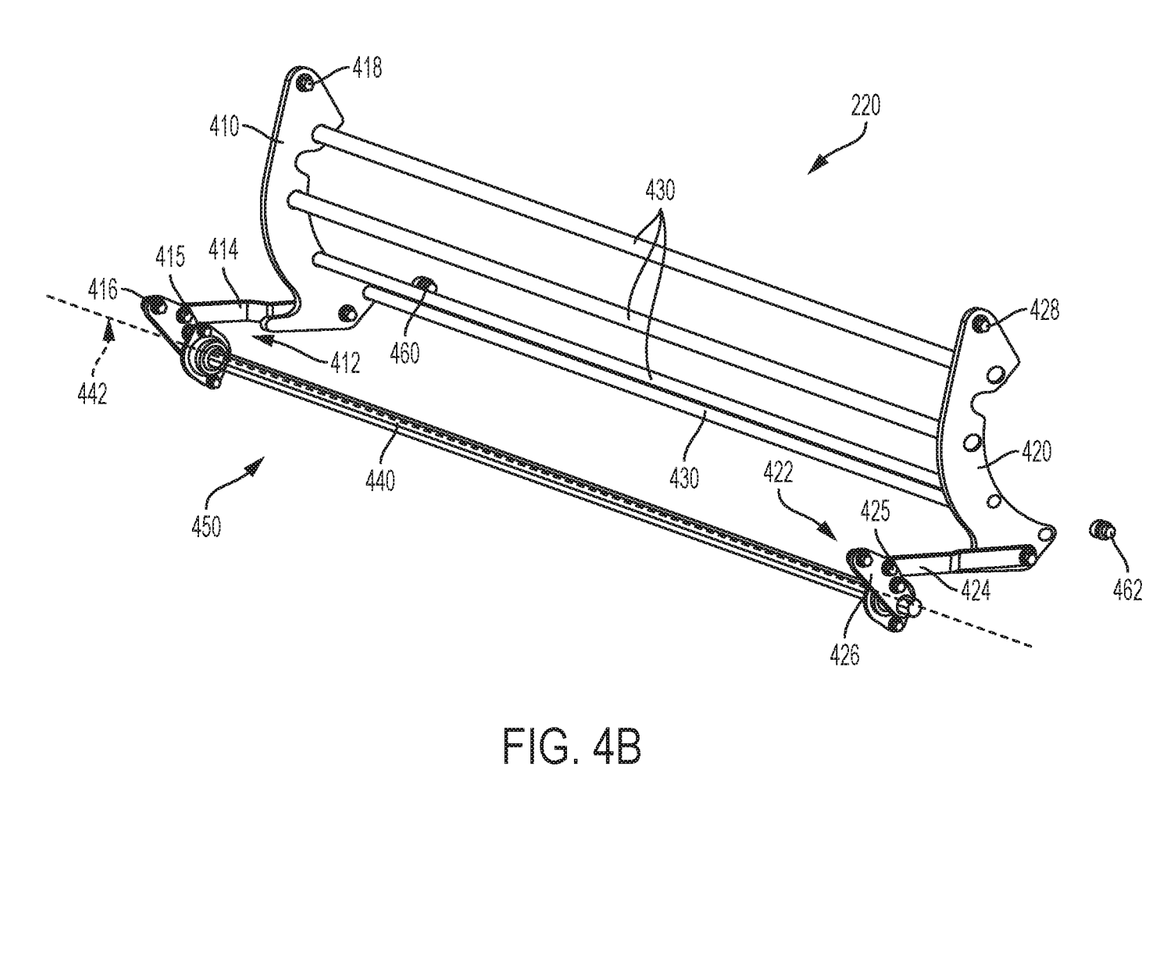
FIG. 4B illustrates the exemplary set of grid bars of FIG. 4A in a released or unlocked position without the other components of the cotton cleaner assembly.
Figure 5A:
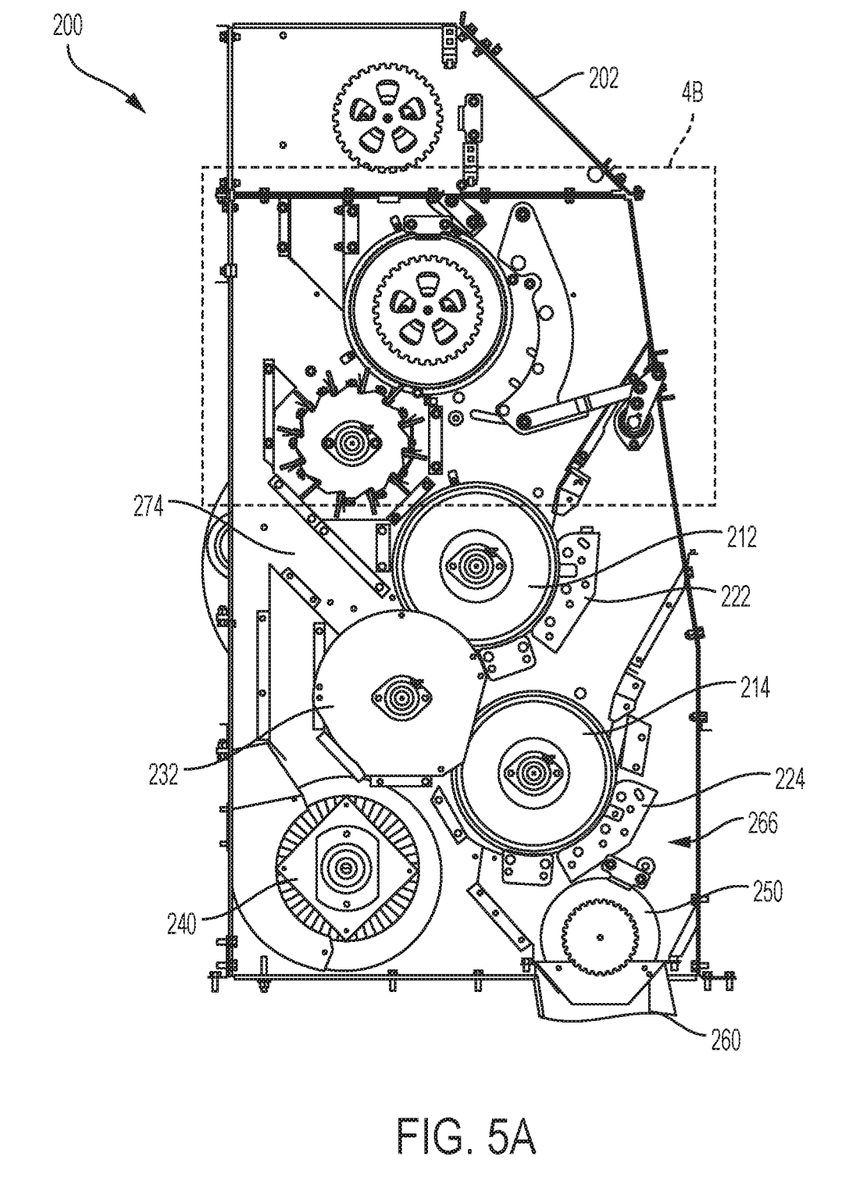
FIG. 5A illustrates a side view of an exemplary cotton cleaner assembly with the top set of grid bars in the released or unlocked position.
Figure 5B:
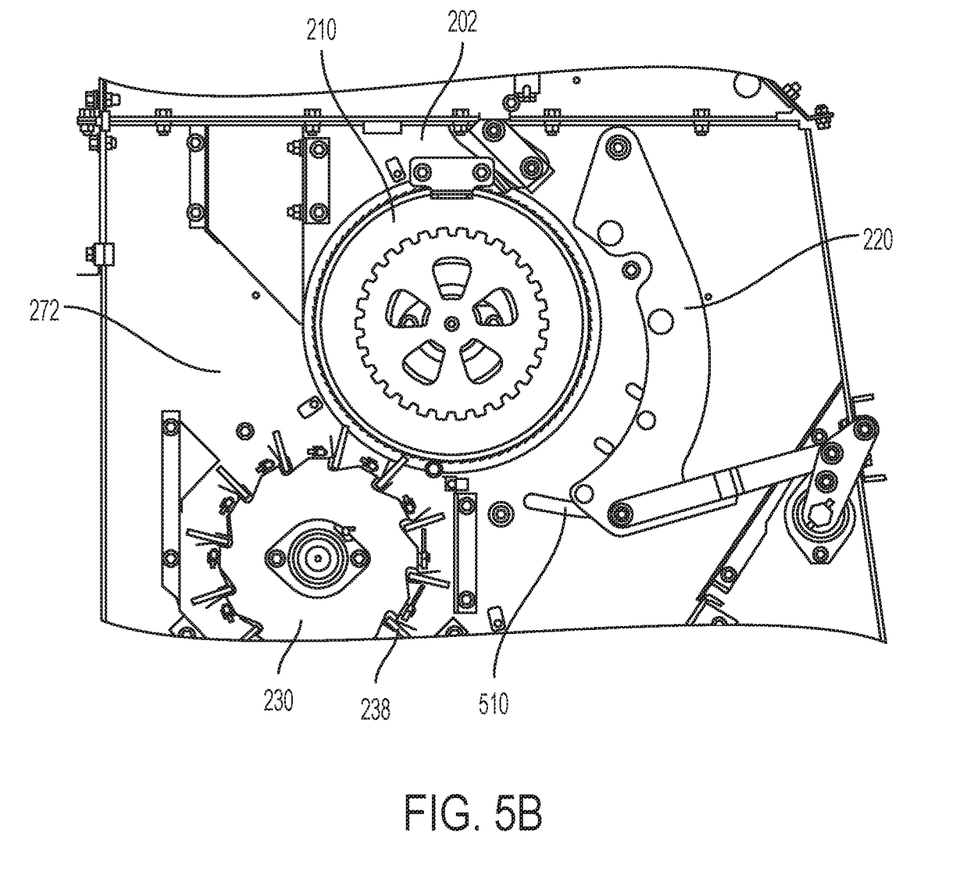
FIG. 5B illustrates a close up view of the area 5B outlined in FIG. 5A.

FIG. 4B shows the exemplary embodiment of the top set of grid bars 220 in a released or unlocked position without the other components of the cotton cleaner assembly 220 for clarity. FIGS. 5A and 5B are similar to FIGS. 2A and 2B except that, in FIGS. 5A and 5B the top set of grid bars 220 are in the released position.

The grid bar release mechanism 450 can move the top set of grid bars 220 between the operational position and the released position. In the grid bar release mechanism embodiment shown in FIGS. 4A and 4B, the grid bar release mechanism 450 pivots the first and second side members 410, 420 about the first and second pivot points 418, 428, respectively, which moves the first and second side members 410, 420 against and away from the first and second stops 460, 462, respectively. In the operational position, the grid bar release mechanism 450 locks the first and second side members 410, 420 against the first and second stops 460, 462. The pivot points 418, 428 and/or the stops 460, 462 can be adjustable to vary the distance between the set of grid bars 220 and the saw drum 210, for example between ⅜ and ½ of an inch. When adjusted to the desired separation, the pivot points 418, 428 and stops 460, 462 are preferably fixed so the grid bars do not move (but can rotate freely) during operation. When the cotton cleaner assembly 200 includes more than one set of saw drums and grid bars, any number of the saw drums can have releasable grid bars. For example, in the embodiment shown in FIGS. 2 and 4, the top and middle sets of grid bars 220, 222 can include a release mechanism 450 and the bottom set of grid bars 224 can be without a release mechanism 450. FIGS. 5A and 5B also show an optional slot 510 in the side wall of the cotton cleaner assembly 200. The ends of the side members 410, 420 that are opposite from the pivot points 418, 428 can move along the slot 510 as the set of grid bars 220 are moved between the locked and unlocked positions.

The exemplary grid bar release mechanism 450 includes a first linkage 412, a second linkage 422 and a shaft 440 where the first and second linkages 412, 422 have an over-center design. FIGS. 4A and 4B also show a rotation axis 442 for the shaft 440. The first linkage 412 includes a front member 414 and a rear member 416 connected at a pivot point 415. The second linkage 422 includes a front member 424 and a rear member 426 connected at a pivot point 425. Front ends of the front members 414, 424 of the linkages 412, 422 are pivotably coupled to the first and second side members 410, 420, respectively. Rear ends of the front members 414, 424 of the linkages 412, 422 are pivotably coupled to front ends of the rear members 416, 426 of the linkages 412, 422 at the pivot points 415, 425, respectively. Rear ends of the rear members 416, 426 of the linkages 412, 422 are fixedly coupled to the shaft 440.

When the shaft 440 is rotated in a clockwise direction around the rotation axis 442, the rear members 416, 426 of the linkages 412, 422 rotate in a clockwise direction (lowering the rear members 416, 426 and the pivot points 415, 425) to bring the front and rear members of the linkages 420, 422 into alignment (see FIG. 4A) which locks the first and second side members 410, 420 against the stops 460, 462. This clockwise rotation of the shaft 440 moves the set of grid bars into the operational or locked position shown in FIGS. 2A, 2B and 4A.

When the shaft 440 is rotated in a counterclockwise direction around the rotation axis 442, the rear members 416, 426 of the linkages 412, 422 rotate in a counterclockwise direction (raising the rear members 416, 426 and the pivot points 415, 425) to bend or misalign the linkages 420, 422 about the pivot points 415, 425 which pulls the front members 414, 424 and the first and second side members 410, 420 away from the stops 460, 462 into an unlocked position (see FIG. 4B). This counterclockwise rotation of the shaft 440 moves the set of grid bars into the released or unlocked position shown in FIGS. 5A, 5B and 4B.

Figure 6:
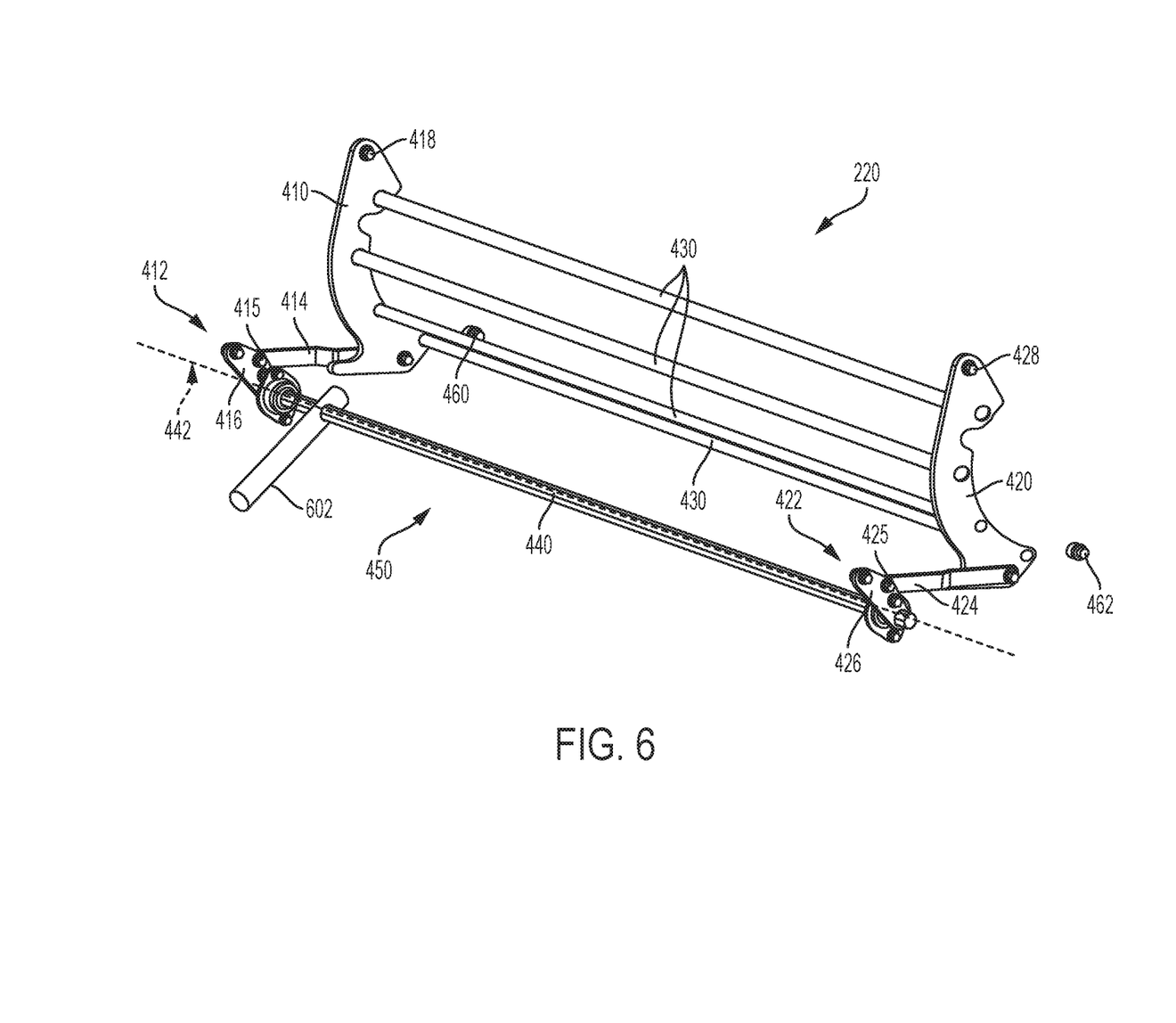
FIG. 6 illustrates the exemplary set of grid bars with a handle attached to the shaft.

The shaft 440 can have a multisided shape (for example, hexagonal or octagonal) that enables it to be securely grabbed by hand or a tool for rotating about the rotation axis 442. A wrench, or adjustable wrench, or special tool can be used to rotate the shaft 440. Alternatively, one or more hydraulic cylinders, or electric actuators or other mechanisms can be used to turn the shaft 440 and move the grid bars between the operational and released positions. Alternatively, a lever 602 can be permanently fixed to the shaft 440 as shown in FIG. 6 so that the lever 602 can be used to rotate the shaft 440 without need of a separate wrench.

Figure 7:
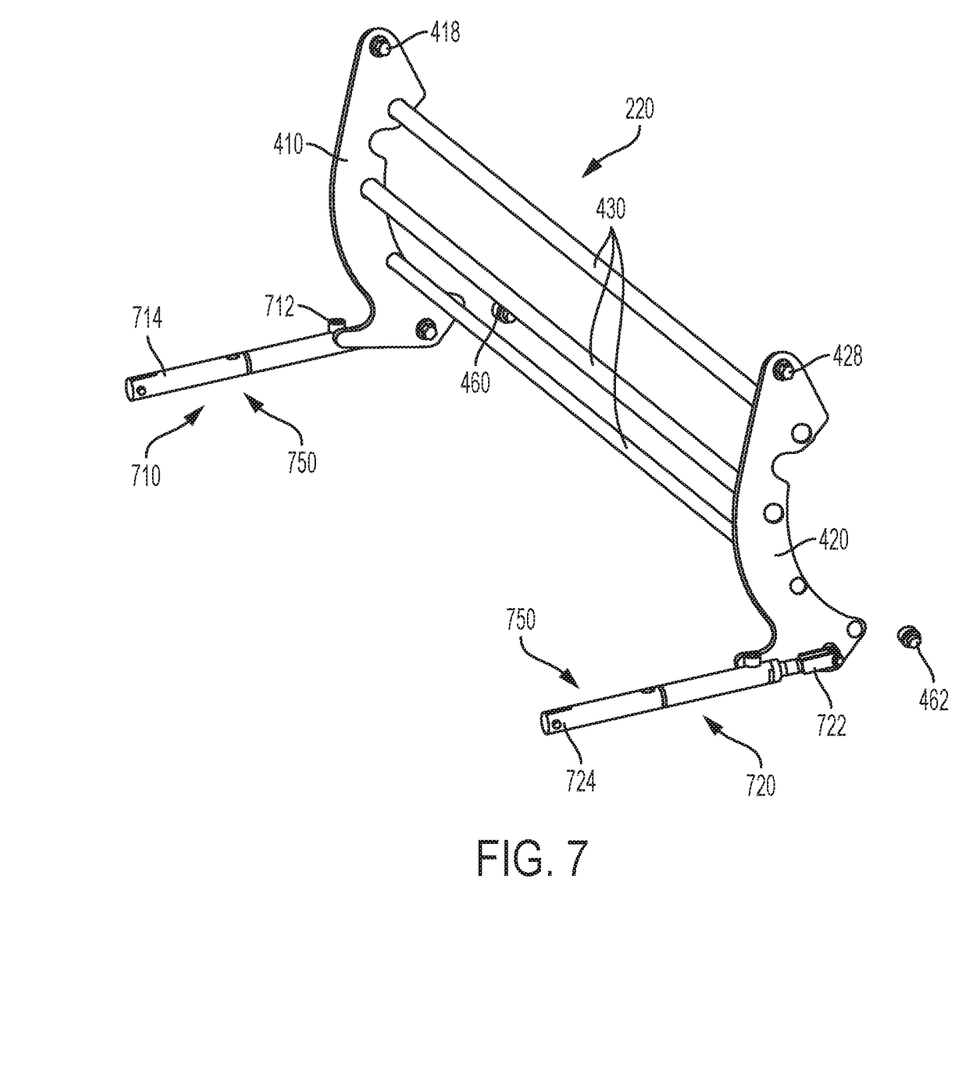
FIG. 7 illustrates an exemplary set of grid bars in a released or unlocked position without the other components of the cotton cleaner assembly with an alternative hydraulic release mechanism.

FIG. 7 shows the top set of grid bars 220 in a released or unlocked position without the other components of the cotton cleaner assembly 220 (similar to FIG. 4B) with an alternative grid bar release mechanism 750 that includes first and second hydraulic cylinders or actuators 710, 720. FIG. 7 shows the first and second side members 410, 420; bars 430; and first and second stops 460, 462. Each of the bars 430 are connected at opposite ends to the first and second side members 410, 420. The first side member 410 has a first pivot point 418, and the second side member 420 has a second pivot point 428.

A rod end 712 of the first hydraulic cylinder 710 is attached to the first side member 410 of the grid bars 220, and a rod end 722 of the second hydraulic cylinder 720 is attached to the second side member 420 of the grid bars 220. Base ends 714, 724 of the first and second hydraulic cylinders 710, 720 can be attached to the walls of the cotton cleaner or another fixed surface. The hydraulic cylinders 710, 720 can be retracted as shown in FIG. 7 to pivot the first and second side members 410, 420 about the first and second pivot points 418, 428, respectively, which moves the first and second side members 410, 420 away from the stops 460, 462 and the saw drum 210 (opens or releases the grid bars 220). The hydraulic cylinders 710, 720 can be extended to pivot the first and second side members 410, 420 about the first and second pivot points 418, 428, respectively, and push the first and second side members 410, 420 against the stops 460, 462 and close to the saw drum 210 (closes or locks the grid bars 220). In the operational position, the grid bar release mechanism 470 locks the first and second side members 410, 420 against the first and second stops 460, 462. The pivot points 418, 428 and/or the stops 460, 462 can be adjustable to vary the distance between the set of grid bars 220 and the saw drum 210. When adjusted to the desired separation, the pivot points 418, 428 and stops 460, 462 are preferably fixed so the grid bars do not move (but can rotate) during operation. When the cotton cleaner assembly 200 includes more than one set of saw drums and grid bars, any number of the saw drums can have releasable grid bars with hydraulic or other types of release mechanisms.

When the saw drum 210 becomes blocked and stops spinning due to cotton and debris wedged between the saw drum 210 and the grid bars 430, the blockage must be cleared. The operator can turn off the cotton cleaner 220 and release the grid bar release mechanism which moves the grid bars 430 away from the saw drum 210. In the released position, the operator can manually remove the plug and/or turn the cotton cleaner back on to have the spinning of the saw drum 210 while the grid bars 430 are moved away naturally release the plug, or a combination of both. Once the plug is removed, the operator can shut the cleaner off and use the grid bar release mechanism to move the grid bars 430 back into the locked or operational position and resume the cotton harvesting process.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A releasable grid bar mechanism for use with a saw drum in a cotton cleaner assembly; the releasable grid bar mechanism comprising:
   a first side member that extends from a proximal end to a distal end, the proximal end of the first side member includes a first pivot point;
   a second side member that extends from a proximal end to a distal end, the proximal end of the second side member includes a second pivot point;
   a plurality of bars that extend between the first and second side members;
   a grid bar release mechanism coupled to the distal ends of the first and second side members, the grid bar release mechanism comprising:
      a shaft;
      a first linkage that couples the shaft to the distal end of the first side member;
      a second linkage that couples the shaft to the distal end of the second side member, where the shaft extends between the first and second linkages;
   wherein rotation of the shaft in a first direction moves the first and second linkages to pivot the first and second side members about the first and second pivot points and move the distal ends of the first and second side members towards the saw drum to move the plurality of bars into an operational position, and rotation of the shaft in a second direction moves the first and second linkages to pivot the first and second side members about the first and second pivot points and move the distal ends of the first and second side members away from the saw drum to move the plurality of bars into a released position, where the second direction is opposite of the first direction;

wherein, in the operational position the grid bar release mechanism locks the plurality of bars in a fixed position relative to the saw drum to knock debris from cotton that rotates with the saw drum, and in the released position the grid bar release mechanism moves the plurality of bars away from the saw drum to enable blockages that interfere with rotation of the saw drum to be cleared.

2. The releasable grid bar mechanism of claim 1, wherein the first and second pivot points are adjustable to adjust the distance between the plurality of bars and the saw drum when the plurality of bars are in the operational position.

3. The releasable grid bar mechanism of claim 1, further comprising:
a first stop; and
a second stop;
wherein movement of the grid bar release mechanism in the first direction pivots the first side member about the first pivot point to lock the distal end of the first side member against the first stop and pivots the second side member about the second pivot point to lock the distal end of the second side member against the second stop to position the plurality of bars in the operational position, and movement of the grid bar release mechanism in the second direction pivots the first side member about the first pivot point to pull the distal end of the first side member away from the first stop and pivots the second side member about the second pivot point to pull the distal end of the second side member away from the second stop to place the plurality of bars in the released position.

4. The releasable grid bar mechanism of claim 3, wherein the first and second stops are adjustable to adjust the distance between the plurality of bars and the saw drum when the plurality of bars are in the operational position.

5. The releasable grid bar mechanism of claim 1, wherein the grid bar release mechanism further comprises:
a lever attached to the shaft;
wherein the lever moves the shaft in the first and second directions to move the first and second linkages to pivot the first and second side members about the first and second pivot points and move the distal ends of the first and second side members towards and away from the saw drum to move the plurality of bars between the operational and released positions.

6. The releasable grid bar mechanism of claim 3, wherein the grid bar release mechanism further comprises:
the shaft rotates about a rotation axis;
the first linkage comprises a first front member and a first rear member connected at a first linkage pivot point, where the first front member couples the distal end of the first side member to the first linkage pivot point and the first rear member couples the shaft to the first linkage pivot point;
the second linkage comprises a second front member and a second rear member connected at a second linkage pivot point, where the second front member couples the distal end of the second side member to the second linkage pivot point and the second rear member couples the shaft to the second linkage pivot point;
wherein rotation of the shaft in the first direction aligns the front and rear members of the first and second linkages to pivot the first and second side members about the first and second pivot points and move the distal ends of the first and second side members against the first and second stops and move the plurality of bars into the operational position, and rotation of the shaft in the second direction bends the first and second linkages about the first and second linkage pivot points to pivot the first and second side members about the first and second pivot points and move the distal ends of the first and second side members away from the first and second stops and move the plurality of bars into the released position; where the second direction is opposite of the first direction.

7. The releasable grid bar mechanism of claim 6, wherein the shaft has a multisided shape such that a wrench can be coupled to the shaft to rotate the shaft in the first and second directions to align and bend the front and rear members of the first and second linkages to move the plurality of bars between the operational and released positions.

8. A releasable grid bar mechanism for use with a saw drum in a cotton cleaner assembly, the grid bar release mechanism comprising:
a first side member that extends from a proximal end to a distal end, the proximal end of the first side member includes a first pivot point;
a second side member that extends from a proximal end to a distal end, the proximal end of the second side member includes a second pivot point;
a plurality of bars that extend between the first and second side members;
a first stop;
a second stop;
a grid bar release mechanism coupled to the distal ends of the first and second side members, the grid bar release mechanism comprising:
a first hydraulic cylinder that couples to the distal end of the first side member to the cotton cleaner assembly;
a second hydraulic cylinder that couples to the distal end of the second side member to the cotton cleaner assembly;
wherein extension of the first and second hydraulic cylinders pivots the first and second side members about the first and second pivot points and moves the distal ends of the first and second side members against the first and second stops, respectively, to move the plurality of bars into an operational position, and retraction of the first and second hydraulic cylinders pivots the first and second side members about the first and second pivot points and moves the distal ends of the first and second side members away from the first and second stops, respectively, to move the plurality of bars into a released position;
wherein, in the operational position the grid bar release mechanism locks the plurality of bars in a fixed position relative to the saw drum to knock debris from cotton that rotates with the saw drum, and in the released position the grid bar release mechanism moves the plurality of bars away from the saw drum to enable blockages that interfere with rotation of the saw drum to be cleared.

9. A cotton cleaner assembly comprising:
a rotatable saw drum with a plurality of teeth;

a first side member that extends from a proximal end to a distal end, the proximal end of the first side member includes a first pivot point;

a second side member that extends from a proximal end to a distal end, the proximal end of the second side member includes a second pivot point;

a plurality of bars that extend between the first and second side members;

a grid bar release mechanism coupled to the distal ends of the first and second side members, where the grid bar release mechanism comprises:

a shaft;

a first linkage that couples the shaft to the distal end of the first side member;

a second linkage that couples the shaft to the distal end of the second side member, where the shaft extends between the first and second linkages;

wherein rotation of the shaft in a first direction moves the first and second linkages to pivot the first and second side members about the first and second pivot points and move the distal ends of the first and second side members towards the saw drum to move the plurality of bars into an operational position, and rotation of the shaft in a second direction moves the first and second linkages to pivot the first and second side members about the first and second pivot points and move the distal ends of the first and second side members away from the saw drum to move the plurality of bars into a released position, where the second direction is opposite of the first direction;

wherein, in the operational position the grid bar release mechanism locks the plurality of bars in a fixed position relative to the saw drum to clean debris from cotton caught on the plurality of teeth that rotate on the saw drum, and in the released position the grid bar release mechanism moves the plurality of bars away from the saw drum to enable blockages between the saw drum and the plurality of bars that interfere with rotation of the saw drum to be cleared.

10. The cotton cleaner assembly of claim 9, further comprising:

a first stop; and a second stop;

wherein movement of the grid bar release mechanism in the first direction pivots the first side member about the first pivot point to lock the distal end of the first side member against the first stop and pivots the second side member about the second pivot point to lock the distal end of the second side member against the second stop to position the plurality of bars in the operational position, and movement of the grid bar release mechanism in the second direction pivots the first side member about the first pivot point to pull the distal end of the first side member away from the first stop and pivots the second side member about the second pivot point to pull the distal end of the first side member away from the second stop to place the plurality of bars in the released position.

11. The cotton cleaner assembly of claim 10, wherein at least one of a) the first and second stops and b) the first and second pivot points are adjustable to adjust the distance between the plurality of bars and the saw drum when the plurality of bars are in the operational position.

12. The cotton cleaner assembly of claim 9, wherein the grid bar release mechanism further comprises:

a lever attached to the shaft;

wherein the lever moves the shaft in the first and second directions to move the first and second linkages to pivot the first and second side members about the first and second pivot points and move the distal ends of the first and second side members towards and away from the saw drum to move the plurality of bars between the operational and released positions.

13. The cotton cleaner assembly of claim 9, wherein the shaft has a multisided shape such that a wrench can be coupled to the shaft to rotate the shaft in the first and second directions to move the first and second linkages to move the plurality of bars between the operational and released positions.

14. The cotton cleaner assembly of claim 10, wherein the grid bar release mechanism further comprises:

a first hydraulic cylinder that couples the distal end of the first side member to the cotton cleaner assembly;

a second hydraulic cylinder that couples the distal end of the second side member to the cotton cleaner assembly;

wherein extension of the first and second hydraulic cylinders moves the grid bar release mechanism in the first direction which pivots the first and second side members about the first and second pivot points and moves the distal ends of the first and second side members towards the first and second stops to move the plurality of bars into the operational position, and retraction of the first and second hydraulic cylinders moves the grid bar release mechanism in the second direction which pivots the first and second side members about the first and second pivot points and moves the distal ends of the first and second side members away from the first and second stops to move the plurality of bars into the released position.

* * * * *